United States Patent
Webb et al.

(10) Patent No.: US 12,505,646 B2
(45) Date of Patent: Dec. 23, 2025

(54) ANONYMIZED DIGITAL IMAGE DUPLICATION DETECTION SYSTEMS AND METHODS

(71) Applicant: Allstate Northern Ireland Limited, Northern Ireland (GB)

(72) Inventors: Stefan Webb, Northern Ireland (GB); Matthew McAuley, North Ireland (GB)

(73) Assignee: Allstate Northern Ireland Limited, Belfast (GB)

( * ) Notice: Subject to any disclaimer, the term of this patent is extended or adjusted under 35 U.S.C. 154(b) by 434 days.

(21) Appl. No.: 18/148,203

(22) Filed: Dec. 29, 2022

(65) Prior Publication Data
US 2024/0221351 A1    Jul. 4, 2024

(51) Int. Cl.
*G06V 10/74* (2022.01)
*G06Q 40/08* (2012.01)
(Continued)

(52) U.S. Cl.
CPC .......... *G06V 10/761* (2022.01); *G06Q 40/08* (2013.01); *G06V 10/751* (2022.01); *G06V 10/82* (2022.01)

(58) Field of Classification Search
CPC .... G06V 10/761; G06V 10/751; G06V 10/82; G06Q 40/08; G06F 18/22
(Continued)

(56) References Cited

U.S. PATENT DOCUMENTS

| 10,410,292 B2* | 9/2019 | Wang ................... G06F 18/241 |
| 10,740,927 B2* | 8/2020 | Wang ...................... G06N 3/08 |

(Continued)

FOREIGN PATENT DOCUMENTS

| CN | 110688514 A | 1/2020 |
| CN | 111461905 A | 7/2020 |

(Continued)

OTHER PUBLICATIONS

Joshua Louwagie, Estimating Claims Remotely? Uncover Potential Fraud in Digital Loss Images, (https://www.verisk.com/insurance/visualize/estimating-claims-remotely-uncover-potential-fraud-in-digital-loss-images/), Apr. 15, 2020, 4 pages.
(Continued)

*Primary Examiner* — Kathleen Y Dulaney
(74) *Attorney, Agent, or Firm* — Dinsmore & Shohl LLP

(57) ABSTRACT

Systems and methods for determining digital image duplication of a digital image with respect to anonymized digital images using an artificial intelligence based software application are implemented. Execution of machine readable instructions by a the processor causes the system to receive an upload of the digital image, generate an encoding of the digital image, compare the encoding of the digital image with a first stored encoding corresponding to a first anonymized digital image, determine a similarity metric, compare the similarity metric to a threshold, determine that the digital image is sufficiently duplicative of the first anonymized digital image associated with the first stored encoding when the first similarity metric equals or exceeds the threshold, and transmit a message indicating an identification of the digital image as sufficiently duplicative of the first anonymized digital image.

20 Claims, 8 Drawing Sheets

(51) Int. Cl.
*G06V 10/75* (2022.01)
*G06V 10/82* (2022.01)

(58) Field of Classification Search
USPC ............... 382/156; 705/4; 701/29.1; 706/20
See application file for complete search history.

(56) References Cited

U.S. PATENT DOCUMENTS

| | | | |
|---|---|---|---|
| 10,776,883 B2 | 9/2020 | Labrie et al. | |
| 11,004,187 B2 | 5/2021 | Kuruvilla et al. | |
| 11,429,812 B2* | 8/2022 | Nataraj | G06V 10/764 |
| 11,449,515 B1* | 9/2022 | Russell | G06F 16/90 |
| 11,908,167 B1* | 2/2024 | Franco | G06T 7/97 |
| 12,187,288 B1* | 1/2025 | Arnicar | B60W 60/001 |
| 2006/0056670 A1* | 3/2006 | Hamadeh | G06T 7/0002 |
| | | | 382/128 |
| 2006/0200307 A1* | 9/2006 | Riess | G06V 20/54 |
| | | | 701/117 |
| 2016/0224805 A1* | 8/2016 | Patti | G16H 30/40 |
| 2019/0095946 A1* | 3/2019 | Azout | G06Q 30/0277 |
| 2020/0219235 A1* | 7/2020 | Xie | G06V 30/413 |
| 2021/0166041 A1* | 6/2021 | Laganière | G06Q 30/0201 |
| 2021/0192693 A1* | 6/2021 | Jepson | G06N 3/084 |
| 2022/0012362 A1* | 1/2022 | Kuta | G06V 10/758 |
| 2022/0121868 A1* | 4/2022 | Chen | G10L 17/22 |
| 2023/0394873 A1* | 12/2023 | Lee | G06T 11/60 |
| 2024/0119758 A1* | 4/2024 | Wang | G06V 10/764 |
| 2024/0188917 A1* | 6/2024 | Min | G06V 10/22 |
| 2024/0355139 A1* | 10/2024 | Kim | G06V 20/56 |

FOREIGN PATENT DOCUMENTS

| | | |
|---|---|---|
| CN | 112232971 A | 1/2021 |
| WO | 2020164331 A1 | 8/2020 |

OTHER PUBLICATIONS

Friss, Leveraging Artificial Intelligence for Automatic Image Analysis, (https://www.friss.com/blog/leveraging-artificial-intelligence-for-automatic-image-analysis/), 2021, 5 pages.

Friss, How Image Analysis Destroyed the Perfect Scam, (https://www.friss.com/blog/how-image-analysis-destroyed-the-perfect-scam-2/), 2021, 4 pages.

* cited by examiner

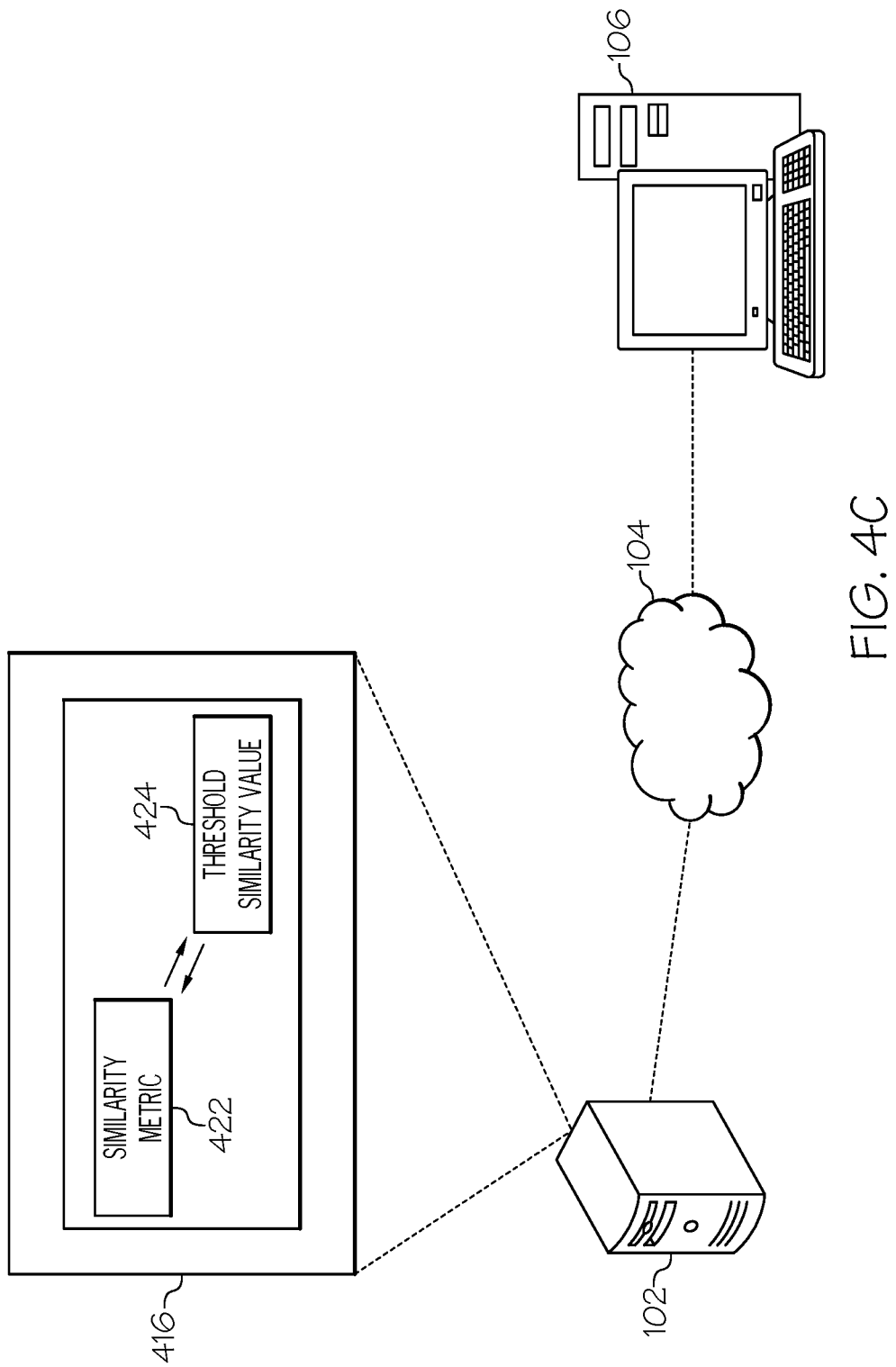

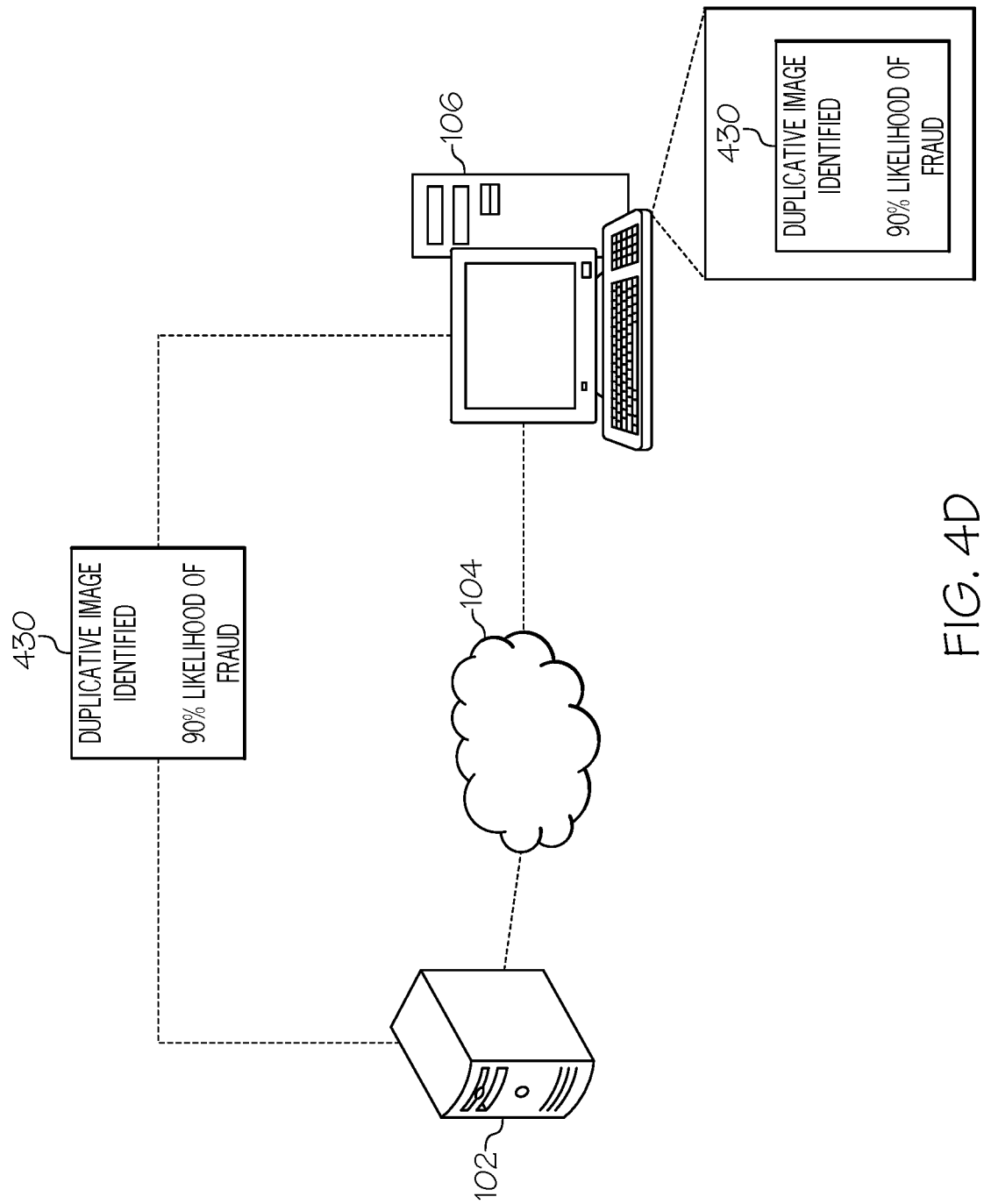

ANONYMIZED DIGITAL IMAGE DUPLICATION DETECTION SYSTEMS AND METHODS

TECHNICAL FIELD

The present disclosure relates to intelligent anonymized digital image duplication detection systems and methods and, in particular, to intelligent systems and methods for determining digital image duplication of a received digital image with respect to anonymized digital images by comparing respective encodings and determining levels of similarity.

BACKGROUND

Insurance companies process claims relating to small and large businesses, vehicle accidents, accidents relating to commercial and residential properties, and so forth, for a large number of customers. As part of the claims filing and resolution process, these companies may require customers to capture and upload images of vehicles in order to assess the extent of vehicle damages and compensate these customers accordingly. Due to the large number of customers served and claims filed, accurately identifying fraudulent claims and reducing or eliminating fraudulent claim payouts aids to ensure that these companies manage costs and maximize profitability. Insurance companies may utilize various techniques to identify fraudulent claims such as manually analyzing claim histories of customers, using private investigators to verify facts of submitted claims, and investigating employees of these companies to determine instances of collusion with customers. However, such techniques may be expensive, resource intensive, and error prone.

Accordingly, a need exists for more accurately and cost effectively identifying fraudulent claims.

BRIEF SUMMARY

According to the subject matter of the present disclosure, a method for determining digital image duplication of a digital image, comprises: receiving, by an artificial intelligence based software application of a computing device, an upload of the digital image, generating, using the artificial intelligence based software application of the computing device, an encoding of the digital image, comparing the encoding of the digital image with a first stored encoding of a plurality of stored encodings to generate a first comparison, wherein the first stored encoding corresponds to a first anonymized digital image of a plurality of anonymized digital images, determining a first similarity metric based on the first comparison, and comparing the first similarity metric to a threshold. The method further comprises: determining, using the artificial intelligence based software application, that the digital image is sufficiently duplicative of the first anonymized digital image of the plurality of anonymized digital images associated with the first stored encoding when the first similarity metric equals or exceeds the threshold, and transmitting a message indicating an identification of the digital image as sufficiently duplicative of the first anonymized digital image of the plurality of anonymized digital images.

According to another embodiment, an intelligent system for determining duplication of a digital image, comprises one or more processors, one or more memory components communicatively coupled to the one or more processors, and machine readable instructions stored in the one or more memory components. The machine readable instructions cause the intelligent system to perform at least the following when executed by the one or more processors: receive an upload of the digital image by an artificial intelligence based software application, generate, using the artificial intelligence based software application, an encoding of the digital image, compare the encoding of the digital image with a first stored encoding of a plurality of stored encodings to generate a first comparison, wherein the first stored encoding corresponds to a first anonymized digital image of a plurality of anonymized digital images, determine a first similarity metric based on the first comparison, compare the first similarity metric to a threshold, determine, using the artificial intelligence based software application, that the digital image is sufficiently duplicative of the first anonymized digital image of the plurality of anonymized digital images associated with the first stored encoding when the first similarity metric equals or exceeds the threshold, and transmit a message indicating an identification of the digital image as sufficiently duplicative of the first anonymized digital image of the plurality of anonymized digital images.

According to yet another embodiment, an intelligent system for determining duplication of a digital image, comprises: one or more processors, one or more memory components communicatively coupled to the one or more processors, and machine readable instructions stored in the one or more memory components. The machine readable instructions cause the intelligent system to perform at least the following when executed by the one or more processors: receive an upload of the digital image by an artificial intelligence based software application, generate, using the artificial intelligence based software application, an encoding of the digital image, compare the encoding of the digital image with each of a plurality of stored encodings to generate respective comparisons, each of the plurality of stored encodings corresponding to a respective one of a plurality of anonymized digital images, determine respective similarity metrics based on the respective comparisons, compare each of the respective similarity metrics a threshold, determine, using the artificial intelligence based software application, that the digital image is sufficiently duplicative of at least one of the plurality of anonymized digital images associated with a respective one of the plurality of stored encodings when at least one of the respective similarity metrics equals or exceeds the threshold, transmit a message indicating an identification of the digital image as sufficiently duplicative of the at least one of the plurality of anonymized digital images, output the message on a display of an external device communicatively coupled to and remote from the computing device, and transmit a request for the at least one of the plurality of anonymized digital images to a platform on which the at least one of the plurality of anonymized digital images is stored based on the identification of the digital image as sufficiently duplicative of the at least one of the plurality of anonymized digital images.

Although the concepts of the present disclosure are described herein with primary reference to an insurance solution, it is contemplated that the concepts will enjoy applicability to many settings for purposes of intelligent solutions, such as other business settings or other suitable settings.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 4C depicts the server comparing the generated encoding with one or more stored encodings, determining a similarity metric, and comparing the similarity matric to a threshold similarity value, according to one or more embodiments described and illustrated herein; and FIG. 4D depicts an illustration of the server transmitting a message indicating a likelihood of the identification of a fraudulent digital image to the mobile device of the user, according to one or more embodiments described and illustrated herein.

DETAILED DESCRIPTION

Figure 1:
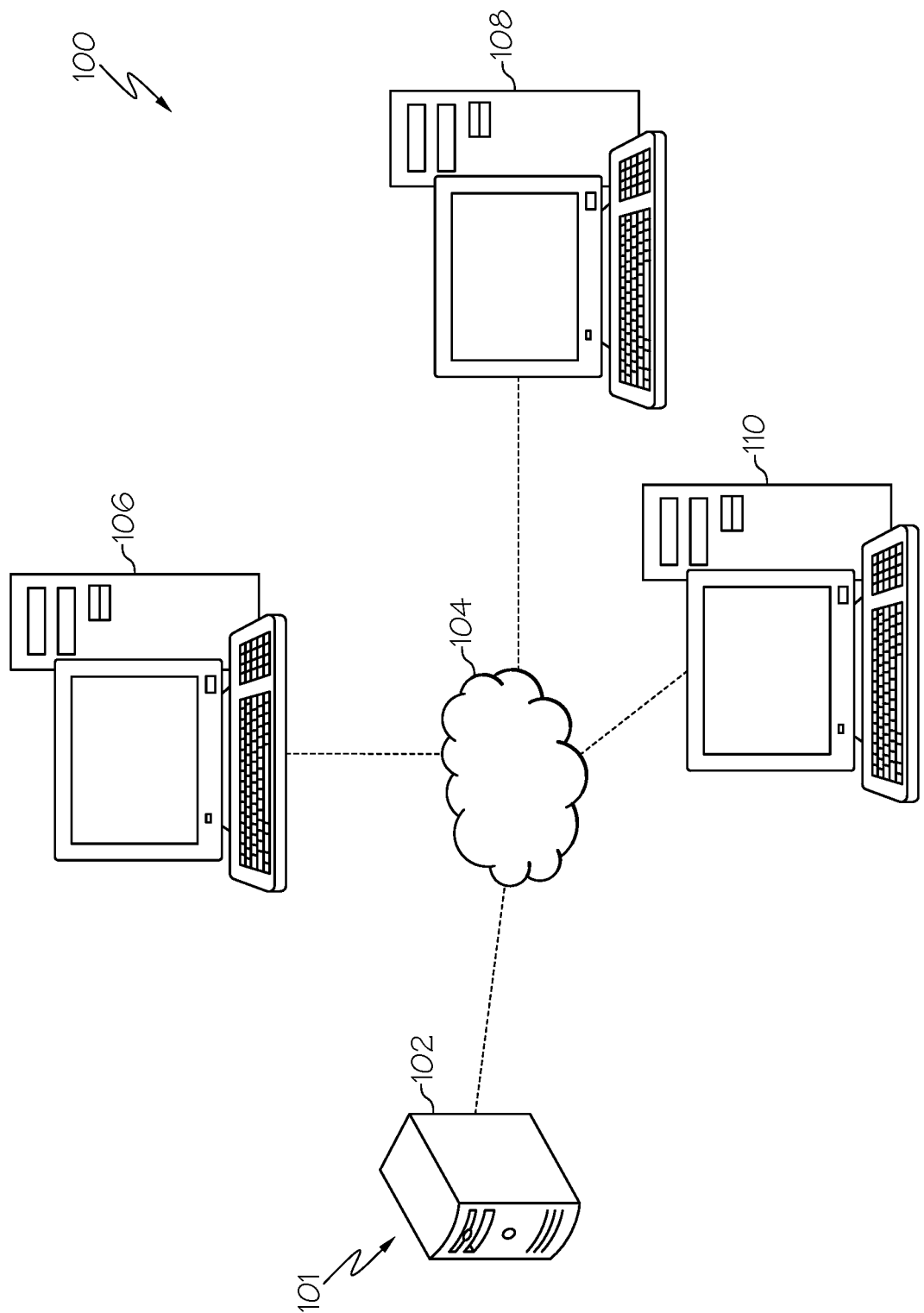
FIG. 1 illustrates a schematic view of an intelligent anonymized digital image duplication detection solution implemented by an intelligent system for determining duplication of a plurality of anonymized digital images, according to one or more embodiments described and illustrated herein.

In embodiments described herein and in greater detail below, an intelligent system for determining duplication of a digital image is configured to implement an intelligent digital image duplication detection solution using one or more computing devices. In an aspect, the embodiments described herein are directed to the functionality of the intelligent system that is configured to utilize an artificial intelligence based software application to determine whether a digital image is sufficiently duplicative of a different digital image by comparing an encoding of the digital image with a different encoding of the different digital image. In embodiments, the intelligent system may determine a similarity metric based on the comparison of the encodings, compare the similarity metric to a similarity threshold value, and determine that the digital image is sufficiently duplicative of a different digital image (e.g., an anonymized digital image) if the similarity metric equals or exceeds the similarity threshold value. It is noted that the encodings may be associated with different types of digital content, e.g., video, images, audio-visual content, etc. The intelligent system may compare encodings of digital images with encodings of videos, audio-visual content, and so forth, to identify levels of similarities between these encodings and determine respective similarity metrics. The system may also utilize these similarity metrics to determine a likelihood of insurance fraud associated with a particular digital content and transmit a message to one or more devices, e.g., a smartphone of a customer that submitted a claim, thereby informing the user of the likelihood of insurance fraud associated with his or her claim.

By way of example, and not as a limitation, the intelligent system may include a plurality of user devices that may be utilized to upload digital content via a software application that operates on these devices. After the upload, respective encodings of the digital content may be generated by the software application and transmitted to the server. The server may store each of the respective encodings locally in memory of the server and/or in one or more locations that are external to the server, e.g., cloud. It is noted that the digital content uploaded by these customers may include their respective personal identification information and confidential information associated with insurance companies of these customers. The generation of encodings associated with these digital images may conceal the personal identification information of these customers and any confidential and proprietary information of the insurance companies of these customers.

The server, by storing each of the respective encodings and enabling a comparison of these encodings, enables a determination of a likelihood of insurance fraud associated with digital content without disclosing the personal identification information of customers and confidential information of the insurance companies. The server provides customers and insurance companies with a large database of digital content that may be shared by these insurance companies for compensation, e.g., a subscription fee. The shared access may enable these companies to, in real time or near real time, compare encodings of digital content uploaded by their respective customers with a robust and comprehensive database of encodings of digital content uploaded by the customers of competitor insurance companies, which may lead to the identification of fraudulent insurance claims. Additionally, comparing encodings instead of directly comparing the different types of digital content enables the insurance companies to access and analyze the subject matter included in the digital content that may be routed, e.g., via their respective proprietary portals, without disclosing personal identification information of their customers and confidential information of these companies.

Referring to FIG. 1, an intelligent anonymized digital image duplication detection solution 100 is shown that may be implemented by the intelligent system 101 for determining duplication of a digital image as described herein. It is noted that an implementation of the intelligent anonymized digital image duplication detection solution 100 by the intelligent system 101 may include receiving encodings of digital images that are uploaded via the artificial intelligence based software application operating on and accessible via, e.g., user devices 106, 108, 110, comparing these encodings with a plurality of stored encodings corresponding to anonymized digital images in order to determine if any of the uploaded digital images are duplicative of one or more of the anonymized digital images. One or more of the uploaded images may be determined to be duplicative if these images include content that is substantially similar or identical to one or more of the anonymized digital images.

In embodiments, the server 102 may be an individual server that acquires data in the form of encodings from the user devices 106, 108, 110, various other servers (not shown), etc., via a communication network 104. The server 102 may collate and analyze the acquired data in the form of encodings and communicate messages, instructions, and so forth, to these servers and each of the user devices 106, 108, 110 via the communication network 104. These messages may be in the form of text message and/or numerical value indicating a likelihood of fraud associated with digital content uploaded by a user.

Figure 2A:
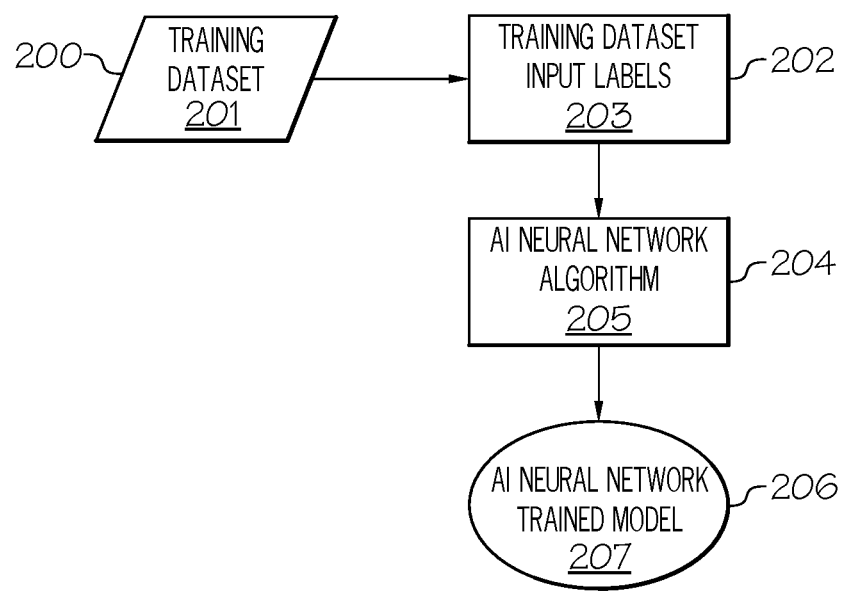
FIG. 2A illustrates a flowchart for training and using the intelligent system, according to one or more embodiments described and illustrated herein.

FIG. 2A illustrates a flowchart for training and using the intelligent system 101. The flowchart includes a block 200 in which a training dataset 201 is trained, and a block 202 in which one or more training dataset input labels 203 are included. In block 204, an artificial intelligence neural network algorithm 205 is trained via blocks 200-202 and applied via an artificial intelligence neural network trained model 207 of block 206. The training may involve utilizing inputs to determine a similarity metric, described in greater detail further below, to determine when an analyzed digital image has a similarity metric determined based on comparison of a generated encoding with an encoded anonymized image to determine sufficient similarity to detect a potential duplication when the similarity metric equals or exceeds a threshold. In embodiments, the artificial intelligence neural network trained model 207 of block 206 may be further trained such as through machine learning allowing for at least partially automated training using the artificial intelligence neural network algorithm 205 of block 204. The artificial intelligence neural network trained model 207 may be implemented as part of the artificial intelligence based software application as described herein to determine whether a digital image (or digital content) is sufficiently duplicative of another digital image (or one or more different types of digital content). The artificial intelligence neural network trained model implemented as part of the artificial intelligence-based software application may also be utilized to determine a likelihood of insurance fraud based on whether a digital image is sufficiently duplicative of another digital image.

The artificial intelligence neural network trained model 207 may utilize the artificial intelligence neural network algorithm 205 to generate further training dataset input labels 203 associated with the training dataset 201, such as through machine learning. In embodiments, the training dataset 201 may include digital content in the form of digital images, video content, audio content, and audio-visual content of, e.g., vehicles of different makes, models, and so forth, in different formats. The digital content may also include images, videos, and so forth, of damaged vehicles that are captured from different orientations. Dates and times at which the digital content was captured may also be included as part of the training dataset 201. Additionally, the training dataset 201 may also include encodings of the digital content.

All or parts of the training dataset may be raw data in the form of images, text, files, videos, and so forth, that may be processed and organized. Such processing and organization may include adding training dataset input labels 203 to the raw data so that the artificial intelligence neural network trained model 207 may be trained based on the training dataset 201, the training dataset input labels 203, and the artificial intelligence neural network algorithm 205, to efficiently generate various results with an aim to be within a certain accuracy percentage and may be associated with confidence threshold values. Such results may be, as described herein, to determine whether digital content is sufficiently duplicative of another digital content, determine a likelihood of insurance fraud based on a level of similarity between two different types of digital content, or combinations thereof.

One or more artificial neural networks (ANNs) used for the artificial intelligence neural network trained model 207 and the artificial intelligence neural network algorithm 205 may include connections between nodes that form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error.

In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling.

The intelligent anonymized digital image duplication detection solution 100 described herein may utilize one or more ANN models as understood to those skilled in the art or as yet-to-be-developed to generate results as described in embodiments herein. Such ANN models may include artificial intelligence components selected from the group that may include, but are not limited to, an artificial intelligence engine, Bayesian inference engine, and a decision-making engine, and may have an adaptive learning engine further comprising a deep neural network learning engine. The one or more ANN models may employ a combination of artificial intelligence techniques, such as, but not limited to, Deep Learning, Random Forest Classifiers, Feature extraction from audio, images, clustering algorithms, or combinations thereof.

In embodiments, a convolutional neural network (CNN) may be utilized. For example, a convolutional neural network (CNN) may be used as an ANN that, in a field of machine learning, for example, is a class of deep, feed-forward ANNs that may be applied for audio-visual analysis. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture.

Figure 2B:
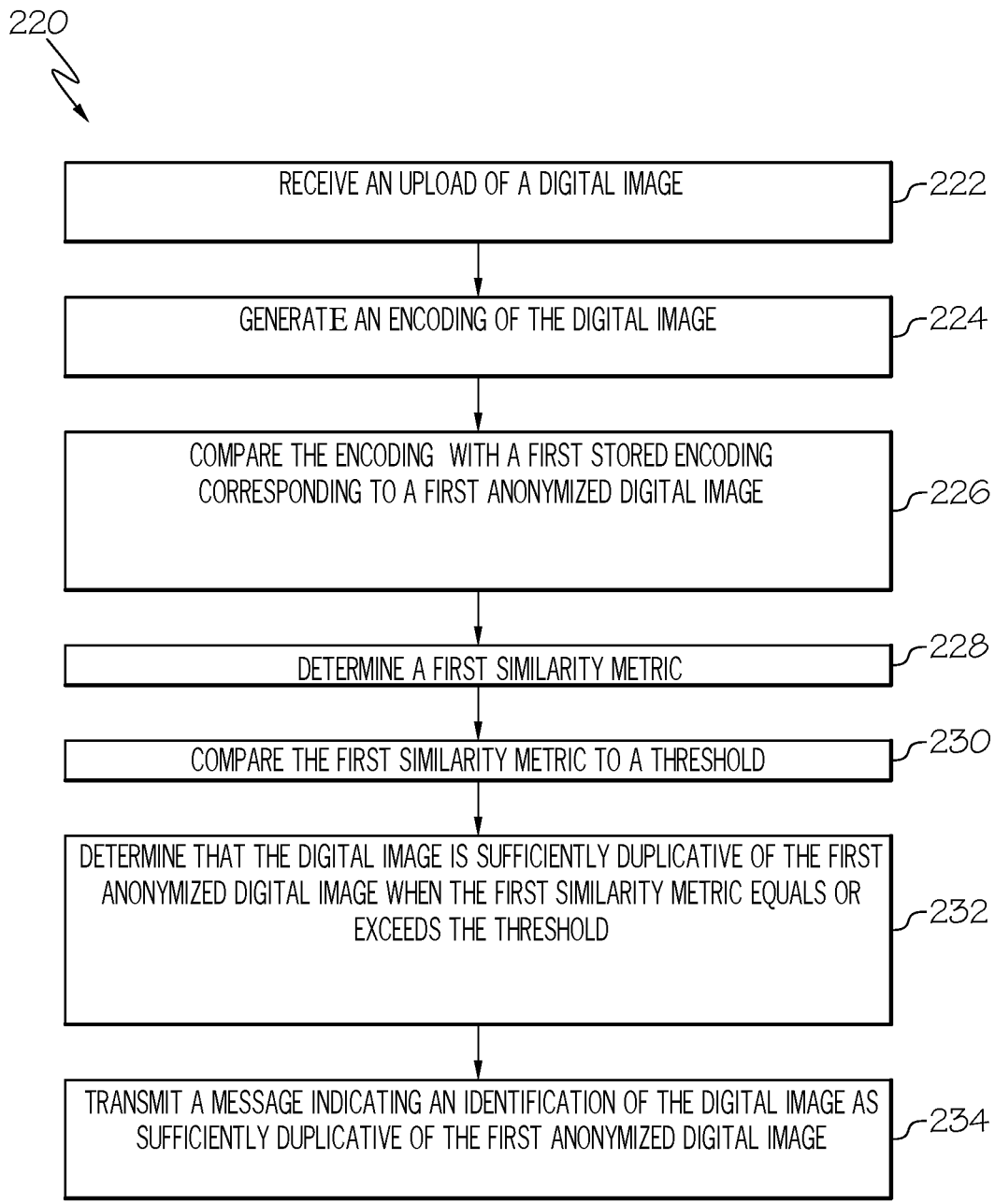
FIG. 2B depicts a process of implementing the intelligent anonymized digital image duplication detection solution using the intelligent system, an artificial intelligence neural network trained model, and the various components of a server operating in conjunction, according to one or more embodiments shown and described herein.

FIG. 2B depicts a process 220 of implementing the intelligent anonymized digital image duplication detection solution 100 using the intelligent system 101, the artificial intelligence neural network trained model 207, and the various components of the server 102 and one or more of the user devices 106, 108, 110, operating in conjunction. In block 222, a digital image that is uploaded from a device that is external to the server 102 may be received. It is noted that the artificial intelligence based software application may operate simultaneously on both the user devices 106, 108, 110 and the server 102. In embodiments, an individual may contact an insurance company to file a claim related an accident involving a vehicle. As part of the claim filing process, the insurance company may request the individual to capture an image of the vehicle involved in the accident in order to collect evidence of vehicle damage. In embodiments, the individual may capture a digital image (or multiple digital images from different angles) using a camera that may be included as part of the user device 106, e.g., a smartphone, a laptop, a tablet, and so forth. The digital image may be of, as a non-limiting example, a vehicle that is a red colored 4-door sedan in which the back bumper and one of the right rear passenger doors has suffered damage. The color and contrast of the digital image may indicate that the image was taken during the day.

The individual may access the artificial intelligence based software application via the user device 106 and upload the captured digital image using the software application. In embodiments, the digital image may be captured from a device that is external to the user device 106 and uploaded to a location on the cloud (e.g., a virtual database that is external to the user device 106 and accessible via the cloud). The user device 106 may be utilized to access the digital image from the cloud, transfer and store the image locally in memory of the user device 106, and upload the image using the software application from the memory of the user device 106. In some embodiments, the image may be uploaded using the software application directly from the location on the cloud.

In block 224, an encoding of the uploaded digital image may be generated. For example, after the individual uploads the image using the artificial intelligence based software application, the software application operating in conjunction with the server 102 may receive instructions to generate an encoding of the uploaded digital image. The encoding may be generated, automatically and without user intervention, by the software application operating on the user device 106 and transmitted to the server 102 via the communication network 104. In embodiments, the encoding may be generated by the software application operating on the user device 106 and a copy of the encoding may be generated and stored locally in memory of the server 102. The encoding may be a mathematical representation of the uploaded digital image such that the uploaded image may be converted into numeric characters. In embodiments, lossless encoding algorithms may be utilized such that all features of the uploaded digital image may be accurately represented by the encoding.

For example, the encoding may include numerical representations corresponding to the intensity, color, contrast, and so forth of the image, in addition to precisely representing the objects included within the image. The encoding of the uploaded digital image may precisely capture the direction from which the digital image of the vehicle was captured, the color of the vehicle, specific details associated with the vehicle, e.g., the areas of the vehicle that were damaged, and so forth. The generated encoding may be communicated, automatically and without user intervention, by the user device 106 to the server 102 using the artificial intelligence based software application. The generation of the encoding of the uploaded digital image anonymizes the image such that the personal identification information of the individual that uploaded the digital image is protected. Additionally, confidential information associated with, for example, the insurance company of the individual is also protected and anonymized.

In block 226, the encoding of the uploaded digital image may be compared to a plurality of encodings that are stored in memory of the server 102. For example, the encoding of the uploaded digital image may be compared to a first stored encoding of a plurality of encodings that corresponds to a first anonymized digital image of a plurality of anonymized digital images that are stored in association with the server 102. In embodiments, the stored encodings may correspond to a variety of different types of digital content that are stored in different formats. For example, the stored encodings may correspond to digital images, digital videos streams, etc., and the stored encodings may be have been uploaded from and received through the artificial intelligence based software application operating on the user device 106, 110 and other such devices. The digital content corresponding to the stored encodings may be associated with users that are different from the individual that uploaded that digital image in block 222. Additionally, the digital content corresponding to the stored encodings may be associated with users that purchased insurance plans through different insurance companies.

In particular, a number of users that purchased insurance plans through insurance companies that are different from the insurance company with whom the individual described above purchased his or her insurance plan may also have access to and utilize the artificial intelligence based software application operating on their respective devices. These users may also upload digital content in a manner that is similar to the manner in which the individual uploaded the digital image. Additionally, separate encodings associated with each of the digital content that is uploaded through the software application may generated and stored in association with the server 102, which anonymizes each of the digital images or other types of digital content corresponding to the separate encodings, which are uploaded by these users. The server 102 may serve as a platform in which different insurance companies, each of which provides insurance services for different users, may store encodings of digital content associated with each of these users. As these encodings are numerical representations of digital content uploaded by the users, the personal identification information of each of these users is protected and the confidentiality of any proprietary information associated with the different insurance companies is maintained.

The server 102 may initially compare the encoding associated with the digital image received, such as via an upload by the individual, with at least one of the stored encodings of digital content, which may involve comparing the distinct numerical representation of the uploaded digital image with a distinct numerical representation of digital content associated with one of the stored encodings. The comparison may be utilized to determine levels of similarity.

In block 228, a first similarity metric based on the first comparison may be determined. For example, the first similarity metric may indicate that a particular stored encoding includes, e.g., 90%, of the features included in the encoding associated with the digital image uploaded by the individual. For example, the digital image associated with the stored encoding may also be of a red colored 4-door sedan in which the back bumper and one of the rear passenger doors has suffered damage. However, the difference of 10% may be due to the fact that the digital image associated with the stored encoding may have been taken from a different angle or orientation than the digital image uploaded by the individual. Additionally, the contrast of the image associated with the stored encoding may vary from that of the digital image uploaded by the individual, indicating that the image associated with the stored encoding was taken perhaps in the evening or at night while the uploaded image was likely taken during the day. In embodiments, the server 102 may compare the encoding associated with the digital image uploaded by the individual with all of the remaining stored encodings and determine respective similarity metrics based on each of the comparisons.

In block 230, the determined first similarity metric may be compared to a threshold. For example, the server 102 may compare the first similarity metric of 90% with a similarity threshold value of, e.g., 85%. It is noted that the similarity threshold may be input and set by a user according to his or her preferences. Additionally, a user and/or the intelligent system 100 may, using the artificial intelligence based software application, modify the similarity threshold value (e.g., reduce the value to 70%, increase the value to 95%, and so forth). If the determined first similarity metric equals or exceeds the similarity threshold of 85%, the server 102 may classify at least one of the stored encoding and the encoding of the uploaded digital image as possibly being fraudulent. A probability or likelihood of fraud value may also be determined based on the similarity metric equaling or exceeding the threshold similarity value. In embodiments, the server 102 may compare the encoding associated with the digital image uploaded by the individual with all of the remaining stored encodings and determine respective similarity metrics based on each of the comparisons. In embodiments, the server 102 may compare the similarity metrics based on each of the comparisons described above with the similarity threshold (e.g., 85%) and classify any additional similarity metrics (and digital content associated with these metrics) as possibly fraudulent if the additional similarity metrics equal or exceed the similarity threshold.

In block 232, that the digital image may be determined as sufficiently duplicative of the first anonymized digital image of the plurality of anonymized digital image of the plurality of anonymized digital images associated with the first stored encoding when the first similarity metric equals or exceeds the threshold. Continuing with the example described above, if the first similarity metric (e.g., having a value of 90%) equals or exceeds the similarity threshold value of 85%, the server 102 may automatically determine using the artificial intelligence neural network based model described above, that the digital image is sufficiently duplicative of the first anonymized image indicating that there is high likelihood that at least one of the stored encoding and the encoding of the uploaded digital image is fraudulent. The high likelihood of probability may be associated with a percentage such as, e.g., 90% likelihood of fraud.

In block 234, a message indicating an identification of the digital image as sufficiently duplicative of the first anonymized digital image of the plurality of anonymize digital images may be transmitted. For example, the message may be in the form of a text message that is sent from the server 102 to the user device 106 of the individual and output on a display of the user device 106. In embodiments, the text message may state that there is a 90% likelihood that either the claim submitted by the individual via the user device 106 or at least one additional claim submitted by another user is fraudulent.

Figure 3:
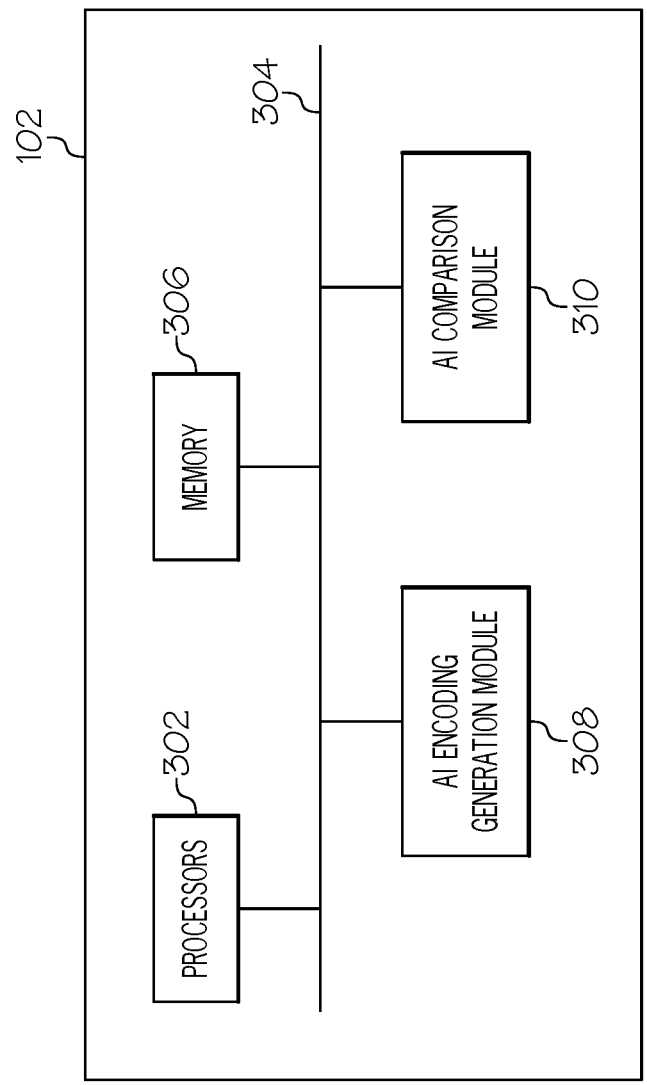
FIG. 3 illustrates an embodiment of components within the server of the intelligent system of FIG. 1 that may be utilized to implement the intelligent anonymized digital image duplication detection solution as described herein, according to one or more embodiments shown and described herein.

FIG. 3 illustrates a server 102, utilized to implement the intelligent system 101, that includes one or more processors 302, a memory 306, an artificial intelligence based encoding generation module 308, and an artificial intelligence based comparison module 310 for use with the process flows described herein, such as the process 220 described in FIG. 2B above, and with embodiments of operations of the intelligent system 101, such as illustrated in FIGS. 4A-4D, also described in greater detail below.

FIG. 3 illustrates an embodiment of components within the server 102 of the intelligent system 101 of FIG. 1 that may be utilized to implement the intelligent anonymized digital image duplication detection solution 100 as described herein. While the server 102 is shown as a single computing device, it is contemplated that a plurality of computing devices across the communication network 104 may serve as the server 102. The server 102 may be installed as part of a hardware component that is communicatively coupled to each of the user devices 106, 108, 110 via the communication network 104. The server 102 may be configured to, based on manual input or automatically and without user intervention, compare encodings of anonymized digital content, and determine whether any of the digital content (e.g., uploaded images) are sufficiently duplicative of other digital images. The artificial intelligence based software application may operate on the server 102.

Figure 4A:
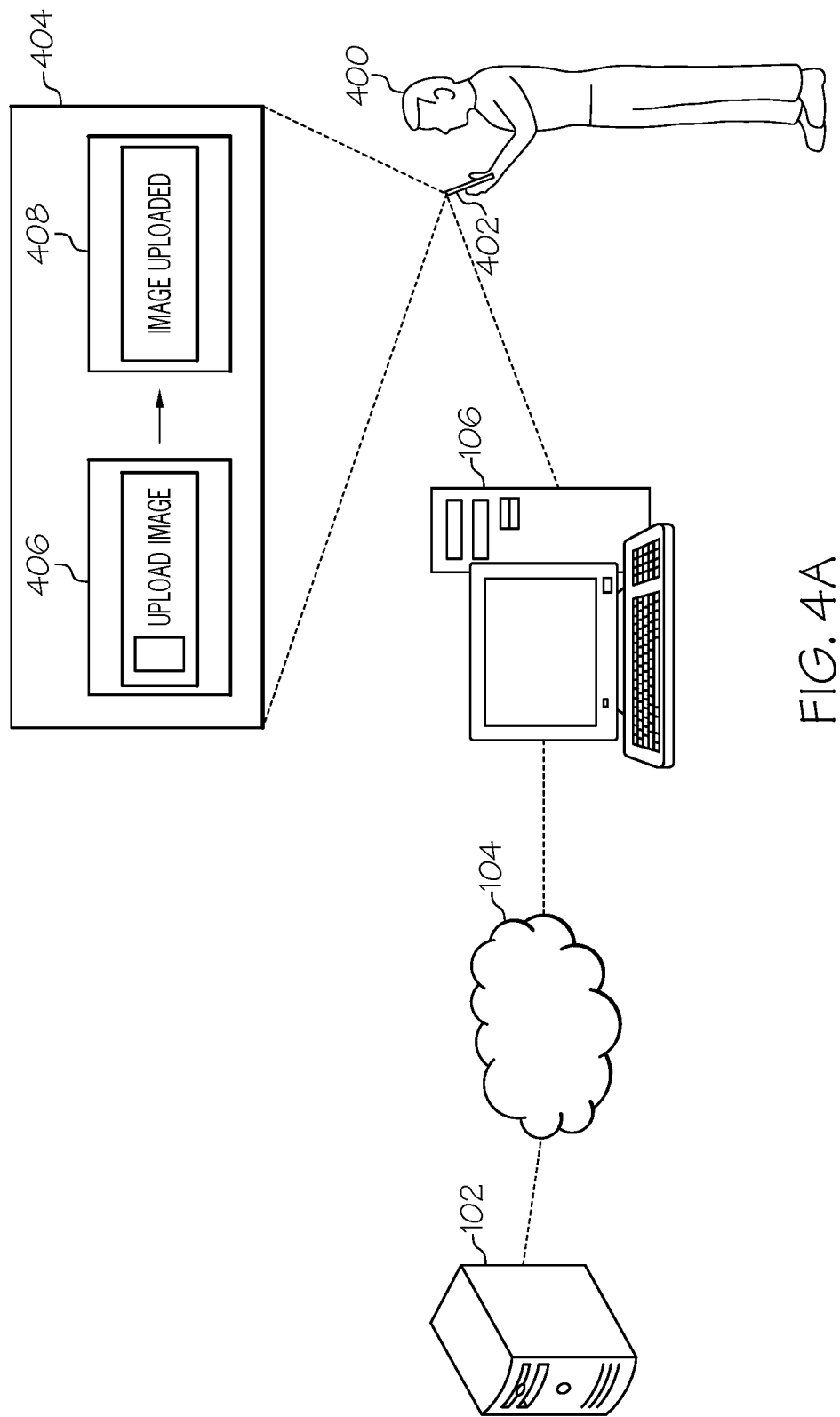
FIG. 4A illustrates uploading an image as part of the implementation of the intelligent anonymized digital image duplication detection solution by the intelligent system, according to one or more embodiments shown and described herein.

Each of the user devices 106, 108, 110 illustrated in FIG. 1 may be a computing device such as a smartphone (e.g., a mobile device 402 as shown in FIG. 4A and described below), a laptop, or other such devices. The artificial intelligence based software application may operate on each of these devices, in addition to the server 102, and the users may upload digital images via the software application. The software application may generate encodings based on receiving instructions from the server 102 via the communication network 104 associated with these uploaded digital images and communicate these encodings to the server 102 for further analysis. As used herein, the term "communicatively coupled" means that the coupled components are capable of exchanging data signals with one another such as, for example, electrical signals via conductive medium, electromagnetic signals via air, optical signals via optical waveguides, and the like. The one or more processors 302 may be configured to operate in a distributed computing environment, and may communicate with one or more external devices as part of a wide area network (WAN), such as an intranet, internet, and so forth.

The memory 306 may comprise RAM, ROM, flash memories, hard drives, or any device capable of storing machine readable and executable instructions such that the machine readable and executable instructions can be accessed by the one or more processors 302. The machine readable and executable instructions may comprise logic or algorithm(s) written in any programming language of any generation (e.g., 1GL, 2GL, 3GL, 4GL, or 5GL) such as, for example, machine language that may be directly executed by the one or more processors 302 or assembly language, object-oriented programming (OOP), scripting languages, microcode, etc., that may be compiled or assembled into machine readable and executable instructions and stored on the memory 306. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the memory 306 stores various types of data, e.g., the data included in the training dataset 201 and the training dataset input labels 203, via a communicatively coupled storage feature such as a database. The memory 306 may store encodings corresponding to a plurality of anonymized digital images, encodings associated with a variety of digital images that are uploaded from various users, e.g., the users associated with user devices 106, 108, 110, and all of the types of data described herein via such a storage feature.

The artificial intelligence based encoding generation module 308, operating in conjunction with the one or more processors 302 may generate instructions by which an encoding may be generated corresponding to one or more digital images uploaded by an individual (e.g., a user associated with the user device 106). As stated, the generated encoding may be transmitted by the user device 106 to the server 102 via the communication network 104. An artificial intelligence based comparison module 310 may be utilized by the artificial intelligence neural network trained model 207 operated within the artificial intelligence based software application to determine whether a digital image (or digital content) is sufficiently duplicative of another digital image (or other digital content), in addition to determining a likelihood of insurance fraud based on whether a digital image is sufficiently duplicative of another digital image (or other digital content).

FIG. 4A illustrates uploading of an image as part of the implementation of the intelligent system 101. In embodiments, a user may access a software application via the mobile device 402 (that may be, for example, the user device 106) by, e.g., selecting an icon output on a display, such as a mobile device graphical user interface (GUI) 404 of the mobile device 402. Additionally, the user 400 may select an image stored locally in memory of the mobile device 402 or access one or more images from one or more locations in memory of devices that are external to the mobile device 402 (e.g., locations on the cloud).

For example, the user 400 may have been involved in an accident, in which his or her vehicle may have suffered damage. The vehicle may have suffered damage on the back bumper and one of the rear passenger doors. The user 400 may take images of the damaged vehicle from various angles, and store these images locally in memory of the mobile device 402, or in one or more locations that are external to the mobile device 402, e.g., one or more databases of external devices, locations on the cloud, etc. From one or more of these storage locations, the user 400 may select and upload an image via the software application. An interface of the software application, as illustrated in FIG. 4A, may include an interactive icon 406 labeled "upload image". The user may select the interactive icon 406, in response to which options for uploading an image may be displayed (not shown). In embodiments, upon the user 400 uploading the images, a message 408 indicating that one or more images selected by the user 400 has been uploaded may be generated and output on the mobile device graphical user interface 404.

Figure 4B:
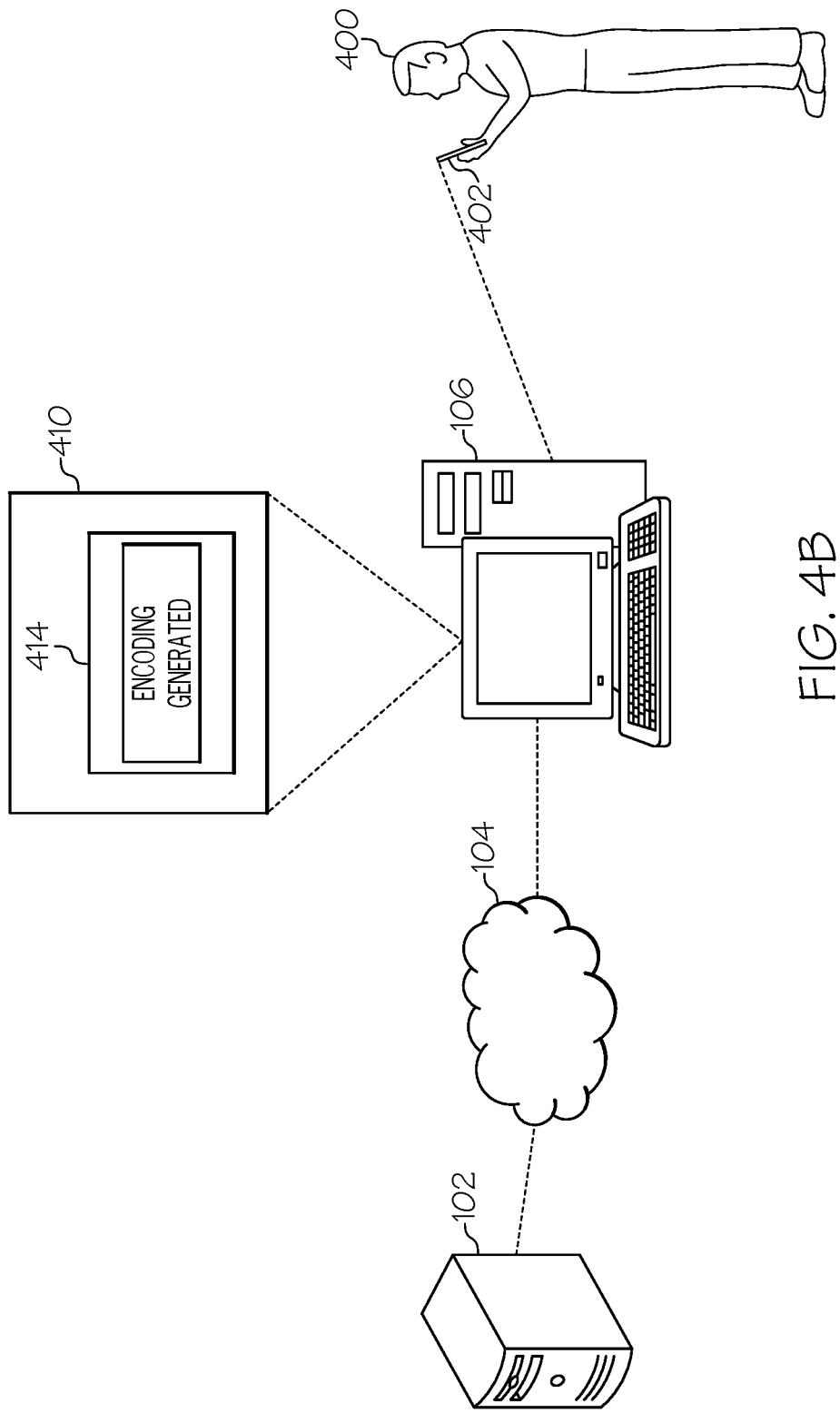
FIG. 4B illustrates a generation of an encoding of a digital image that is uploaded in FIG. 4A, according to one or more embodiments shown and described herein.

FIG. 4B illustrates a generation of an encoding of a digital image that is uploaded via the software application. The artificial intelligence based encoding generation module 308 (FIG. 3) may, via the software application, generate an encoding of the digital image that was uploaded by the user 400, as described above with respect to FIG. 4A. Encodings of images refer to mathematical representations that represent aspects of these images, which enable the sharing and analysis of these images without disclosing proprietary information or personally identifiable information, namely information that is specific to the user 400 or confidential and proprietary information that of the user's insurance company.

For example, an encoding that is representative of an uploaded image of the damaged vehicle of the user 400 may be generated. The generated encoding may represent all of the details included in the upload image, namely the damage on the back bumper and one of the rear passenger doors, a direction from which the image of the vehicle was taken, the contrast and brightness of an image, and other image based details. If multiple digital images are uploaded by the user 400, an encoding specific to each digital image may be generated and each generated encoding may precisely represent all aspects of the digital image. After the encodings are generated, an encoding generated message 414 may be output on the mobile device graphical user interface 404 of the mobile device 402. In embodiments, the generated encoding may be transmitted to the server 102 via the communication network 104. As stated above, it is noted that an encoding that is generated is able to mask or conceal specific personal identification information associated with the user and any confidential information associated with an insurance company associated with the user.

FIG. 4C depicts the server 102 implementing the steps of comparing the generated encoding with one or more stored encodings, determining a similarity metric, and comparing the similarity metric to a threshold similarity value. In embodiments, the server may be coupled to a display device (not shown) in which a server graphical user interface 416 may be output. In embodiments, the encoding that was received by the server 102 from the mobile device 402 may be compared with one or more of a plurality of stored encodings simultaneously or according to a specified order. The plurality of stored encodings may be associated with content uploaded by users other than the user 400. In embodiments, the stored encodings may be associated with digital content in the form of digital images, video streams in a variety of formats, e.g., JPEG, GIF, PNG, PNM, AVI, MPEG, Windows Media Video, and so forth.

In embodiments, the artificial intelligence based comparison module 310 (FIG. 3) may compare the encoding associated with the uploaded image with a plurality of stored encodings, which may include determining whether any of the content included in the plurality of stored encodings is similar to the content included in the encoding of the image received from the mobile device 402. In particular, the mathematical representations associated with a stored encoding may be compared to a mathematical representation of the encoding of the image received from the mobile device to determine a similarity metric 422 (e.g., a first similarity metric) between the stored encoding and the encoding of the received image. In embodiments, the stored encoding may correspond to a digital image or a video. The similarity metric 422 may be compared to a threshold similarity value 424 and if the similarity metric 422 equals or exceeds the threshold similarity value 424, the artificial intelligence based comparison module 310 may determine that the encoding of the receive digital image is sufficiently duplicative of the stored encoding associated with a digital image or video stream.

For example, the comparison of the encodings by the artificial intelligence based comparison module 310 may indicate that the content included in the image of the vehicle that was uploaded by the user 400, namely the location and extent of damages on the back bumper and one of the rear passenger doors, was also substantially present in the image associated with the stored encoding. For example, the digital image associated with the stored encoding may be an image of the vehicle of the user 400 that is identical to the image that was uploaded by the user 400. In such a scenario, the artificial intelligence based comparison module 310 may determine that at least one of the digital image associated with the stored encoding or the image of the vehicle uploaded by the user 400 is potentially a fraudulent image.

In another example, the digital image associated with the stored encoding may be an image of the vehicle of the user 400 that may be taken from a different direction or orientation than the image that was uploaded by the user 400, and as such, the digital image associated with the stored encoding may not be identical to the uploaded image. The comparison, however, of the encodings of both the stored image and the uploaded image may provide sufficient similarities between the images such that both images may be of the same vehicle. For example, even though the image associated with the stored encoding may be of the vehicle of the user 400 that is captured from a different direction or orientation, the extent and location of damage, the color, make, and model of the vehicle, and various other factors may indicate that the image associated with the stored encoding and the image uploaded by the user 400 are of the same vehicle.

In embodiments, if the similarity metric 422 fails to equal or exceed the threshold similarity value 424, the artificial intelligence based comparison module 310 may determine that the encoding of the receive digital image is not sufficiently duplicative of the stored encoding associated with a digital image or video stream. In such a scenario, the artificial intelligence based comparison module 310 may select another one of the plurality of encodings and compare this encoding with the encoding of the image that was uploaded by the user 400 and generate an additional similarity metric (e.g., a second similarity metric), which may be compared to the threshold similarity value 424. If the second similarity metric equal or exceed the threshold similarity value 428, the artificial intelligence based comparison module 310 may determine that another image that is associated with the second selected encoding of the plurality of stored encodings is sufficiently duplicative of the stored encoding associated with a digital image or video stream.

Alternatively, if the second similarity metric fails to equal or exceed the threshold similarity value 424, the artificial intelligence based comparison module 310 may select a third encoding from the plurality of stored encodings and compare the third encoding with the encoding of the image uploaded by the user 400. In other embodiments, irrespective of the result of a comparison performed by the artificial intelligence based comparison module 310, the artificial intelligence based comparison module 310 may iteratively compare each one of the plurality of stored encodings with the encoding of the image uploaded by the user 400 to determine respective similarity metrics and compare these similarity metrics with the threshold similarity value 424. In embodiments, a numeric value representing a likelihood of at least one of the digital images associated with the stored encoding and the image of the vehicle uploaded by the user 400 being fraudulent is output on the display device coupled to the server 102. Additionally, respective numeric values associated with each one of the similarity metrics may be output on the display device coupled to the server 102.

FIG. 4D depicts an illustration of the server 102 transmitting a message indicating a likelihood of the identification of a fraudulent digital image to the mobile device 402 of the user 400. In embodiments, in a scenario in which one or more stored encodings are determined as being sufficiently duplicative of the image uploaded by the user 400, the server 102 may generate a message indicative of the duplication and transmit the message to the mobile device 402 via the communication network 104. In embodiments, the message, as illustrated in FIG. 4D, may be a text message that sent to the mobile device 402 and which may appear on the mobile device graphical user interface 404. For example, the text message 430 may state "Duplicate Image Identified, 90% Likelihood of Fraud." It is noted that the text message 430 may take the form of an audio message that may be output via the speakers of the mobile device 402.

In embodiments, the user 400 may have the option of altering the threshold similarity value 424 in real time via the software application. For example, the user 400 may input into a text or numeric field associated with the software application that appears on the mobile device graphical user interface 404, a threshold similarity value of 80%. In response, the server 102 may determine similarity metrics and compare these similarity metrics with the modified threshold similarity value of 80%. If any of the similarity metrics equal or exceed the threshold similarity value of 80%, the artificial intelligence based comparison module 310 may determine that stored encodings based on which these similarity metrics were determined are sufficiently duplicative of the image uploaded by the user. As stated above, the server 102 may then generate respective messages of likelihoods of fraudulent digital content based on the newly determined similarity metrics being compared to the threshold similarity value of 80% and transmit these messages to the mobile device 402 of the user 400.

It is also noted that recitations herein of "at least one" component, element, etc., should not be used to create an inference that the alternative use of the articles "a" or "an" should be limited to a single component, element, etc. It is noted that recitations herein of a component of the present disclosure being "configured" or "programmed" in a particular way, to embody a particular property, or to function in a particular manner, are structural recitations, as opposed to recitations of intended use.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing

Aspect 1. A method for determining digital image duplication of a digital image comprising receiving, by an artificial intelligence based software application of a computing device, an upload of the digital image, generating, using the artificial intelligence based software application of the computing device, an encoding of the digital image, comparing the encoding of the digital image with a first stored encoding of a plurality of stored encodings to generate a first comparison, wherein the first stored encoding corresponds to a first anonymized digital image of a plurality of anonymized digital images, determining a first similarity metric based on the first comparison, comparing the first similarity metric to a threshold, determining, using the artificial intelligence based software application, that the digital image is sufficiently duplicative of the first anonymized digital image of the plurality of anonymized digital images associated with the first stored encoding when the first similarity metric equals or exceeds the threshold, and transmitting a message indicating an identification of the digital image as sufficiently duplicative of the first anonymized digital image of the plurality of anonymized digital images.

Aspect 2. The method of Aspect 1, further comprising outputting the message on a display of an external device communicatively coupled to and remote from the computing device.

Aspect 3. The method of Aspect 2, wherein the message includes text indicating a likelihood of insurance fraud associated with the digital image.

Aspect 4. The method of any of Aspect 1 to Aspect 3, wherein the message includes a numeric value indicating a likelihood of insurance fraud associated with the digital image.

Aspect 5. The method of any of Aspect 1 to Aspect 4, further comprising comparing the encoding of the digital image with a second stored encoding of the plurality of stored encodings to generate a second comparison when the first similarity metric is less than the threshold, wherein the second stored encoding corresponds to a second anonymized digital image of the plurality of anonymized digital images, and determining a second similarity metric based on the second comparison.

Aspect 6. The method of Aspect 5, further comprising comparing the second similarity metric to the threshold, and determining, using the artificial intelligence based software application, that the digital image is sufficiently duplicative of the second anonymized digital image of the plurality of anonymized digital images associated with the second stored encoding when the second similarity metric equals or exceeds the threshold.

Aspect 7. The method of Aspect 6, further comprising transmitting to an external device communicatively coupled to and remote from the computing device a secondary message indicating an identification of the digital image as sufficiently duplicative of the second anonymized digital image of the plurality of anonymized digital images.

Aspect 8. A method of any of Aspect 1 to Aspect 7, further comprising receiving an input modifying the threshold, and updating the threshold based on the input.

Aspect 9. The method of any of Aspect 1 to Aspect 8, further comprising transmitting a request for the first anonymized digital image to a platform on which the first anonymized digital image is stored based on the identification of the digital image as sufficiently duplicative of the first anonymized digital image.

Aspect 10. An intelligent system for determining digital image duplication of a digital image comprising one or more processors, one or more memory components communicatively coupled to the one or more processors, and machine readable instructions stored in the one or more memory components that cause the intelligent system to perform at least the following when executed by the one or more processors: receive an upload of the digital image by an artificial intelligence based software application, generate, using the artificial intelligence based software application, an encoding of the digital image, compare the encoding of the digital image with a first stored encoding of a plurality of stored encodings to generate a first comparison, wherein the first stored encoding corresponds to a first anonymized digital image of a plurality of anonymized digital images, determine a first similarity metric based on the first comparison, compare the first similarity metric to a threshold, determine, using the artificial intelligence based software application, that the digital image is sufficiently duplicative of the first anonymized digital image of the plurality of anonymized digital images associated with the first stored encoding when the first similarity metric equals or exceeds the threshold, and transmit a message indicating an identification of the digital image as sufficiently duplicative of the first anonymized digital image of the plurality of anonymized digital images.

Aspect 11. The intelligent system of Aspect 10, wherein the machine readable instructions further cause the intelligent system to perform at least the following when executed by the one or more processors: output the message on a display of an external device communicatively coupled to and remote from the one or more processors.

Aspect 12. The intelligent system of Aspect 11, wherein the message includes text indicating a likelihood of insurance fraud associated with the digital image.

Aspect 13. The intelligent system of Aspect 10 or Aspect 11, wherein the message includes a numeric value indicating a likelihood of insurance fraud associated with the digital image.

Aspect 14. The intelligent system of any of Aspect 10 to Aspect 13, wherein the machine readable instructions further cause the intelligent system to perform at least the following when executed by the one or more processors: compare the encoding of the digital image with a second stored encoding of the plurality of additional encodings to generate a second comparison when the first similarity metric is less than the threshold, wherein the second stored encoding corresponds to a second anonymized digital image of the plurality of anonymized digital images, and determine a second similarity metric based on the second comparison.

Aspect 15. The intelligent system of Aspect 14, wherein the machine readable instructions further cause the intelligent system to perform at least the following when executed by the one or more processors: compare the second similarity metric to the threshold, and determine, using the artificial intelligence based software application, that the digital image is sufficiently duplicative of the second anonymized digital image of the plurality of anonymized digital images associated with the second stored encoding when the second similarity metric equals or exceeds the threshold.

Aspect 16. The intelligent system of Aspect 15, wherein the machine readable instructions further cause the intelligent system to perform at least the following when executed by the one or more processors: transmit, to an external device, a secondary message indicating an identification of the digital image as sufficiently duplicative of the second anonymized digital image of the plurality of anonymized digital images.

Aspect 17. The intelligent system of any of Aspect 10 to Aspect 16, wherein the machine readable instructions further cause the intelligent system to perform at least the following when executed by the one or more processors: receive an input modifying the threshold; and updating the threshold based on the input.

Aspect 18. The intelligent system of any of Aspect 10 to Aspect 17, wherein the machine readable instructions further cause the intelligent system to perform at least the following when executed by the one or more processors: transmit a request for a first anonymized digital image to a platform on which the first anonymized digital image is stored based on the identification of the digital image as sufficiently duplicative of the first anonymized digital image.

Aspect 19. An intelligent system for determining digital image duplication of a digital image, comprising: one or more processors; one or more memory components communicatively coupled to the one or more processors; and machine readable instructions stored in the one or more memory components that cause the intelligent system to perform at least the following when executed by the one or more processors: receive an upload of the digital image by an artificial intelligence based software application, generate, using the artificial intelligence based software application, an encoding of the digital image, compare the encoding of the digital image with each of a plurality of stored encodings to generate respective comparisons, each of the plurality of stored encodings corresponding to a respective one of a plurality of anonymized digital images to generate respective comparisons, determine respective similarity metrics based on the respective comparisons, compare each of the respective similarity metrics to a threshold, determine, using the artificial intelligence based software application, that the digital image is sufficiently duplicative of at least one of the plurality of anonymized digital images associated a respective one of the plurality of stored encodings when at least one of the respective similarity metrics equals or exceeds the threshold, transmit a message indicating an identification of the digital image as sufficiently duplicative of the at least one of the plurality of anonymized digital images, output the message on a display of an external device communicatively coupled to and remote from the computing device, and transmit a request for the at least one of the plurality of anonymized digital images to a platform on which the at least one of the plurality of anonymized digital images is stored based on the identification of the digital image as sufficiently duplicative of the at least one of the plurality of anonymized digital images.

Aspect 20. The intelligent system of Aspect 19, wherein the message includes text indicating a likelihood of insurance fraud associated with the digital image.

What is claimed is:

1. A method for determining digital image duplication of a digital image, comprising:
    receiving, by an artificial intelligence based software application of a computing device, an upload of the digital image;
    generating, using the artificial intelligence based software application of the computing device, an encoding of the digital image, wherein the encoding of the digital image comprises a mathematical representation representative of a plurality of features included within the digital image;
    comparing the encoding of the digital image with a first stored encoding of a plurality of stored encodings to generate a first comparison, wherein the first stored encoding corresponds to a first anonymized digital image of a plurality of anonymized digital images;
    determining a first similarity metric based on the first comparison;
    comparing the first similarity metric to a threshold;
    determining, using the artificial intelligence based software application, that the digital image is sufficiently duplicative of the first anonymized digital image of the plurality of anonymized digital images associated with the first stored encoding when the first similarity metric equals or exceeds the threshold to generate a determination of digital image duplication of the digital image with respect to the first anonymized image; and
    transmitting a message indicating an identification of the digital image as sufficiently duplicative of the first anonymized digital image of the plurality of anonymized digital images.

2. The method of claim 1, further comprising outputting the message on a display of an external device communicatively coupled to and remote from the computing device.

3. The method of claim 2, wherein the message includes text indicating a likelihood of insurance fraud associated with the digital image based on the determination of digital image duplication of the digital image with respect to the first anonymized image.

4. The method of claim 2, wherein the message includes a numeric value indicating a likelihood of insurance fraud associated with the digital image based on the determination of digital image duplication of the digital image with respect to the first anonymized image.

5. The method of claim 1, further comprising:
    comparing the encoding of the digital image with a second stored encoding of the plurality of stored encodings to generate a second comparison when the first similarity metric is less than the threshold, wherein the second stored encoding corresponds to a second anonymized digital image of the plurality of anonymized digital images; and
    determining a second similarity metric based on the second comparison.

6. The method of claim 5, further comprising:
    comparing the second similarity metric to the threshold; and
    determining, using the artificial intelligence based software application, that the digital image is sufficiently duplicative of the second anonymized digital image of the plurality of anonymized digital images associated with the second stored encoding when the second similarity metric equals or exceeds the threshold.

7. The method of claim 6, further comprising transmitting, to an external device communicatively coupled to and remote from the computing device, a secondary message indicating an identification of the digital image as sufficiently duplicative of the second anonymized digital image of the plurality of anonymized digital images.

8. The method of claim 1, further comprising:
    receiving an input modifying the threshold; and
    updating the threshold based on the input.

9. The method of claim 1, further comprising:
    transmitting a request for the first anonymized digital image to a platform on which the first anonymized digital image is stored based on the identification of the digital image as sufficiently duplicative of the first anonymized digital image.

10. An intelligent system for determining duplication of a digital image, comprising:
one or more processors;
one or more memory components communicatively coupled to the one or more processors; and
machine readable instructions stored in the one or more memory components that cause the intelligent system to perform at least the following when executed by the one or more processors:
receive an upload of the digital image by an artificial intelligence based software application;
generate, using the artificial intelligence based software application, an encoding of the digital image, wherein the encoding of the digital image comprises a mathematical representation representative of a plurality of features included within the digital image;
compare the encoding of the digital image with a first stored encoding of a plurality of stored encodings to generate a first comparison, wherein the first stored encoding corresponds to a first anonymized digital image of a plurality of anonymized digital images;
determine a first similarity metric based on the first comparison;
compare the first similarity metric to a threshold;
determine, using the artificial intelligence based software application, that the digital image is sufficiently duplicative of the first anonymized digital image of the plurality of anonymized digital images associated with the first stored encoding when the first similarity metric equals or exceeds the threshold to generate a determination of digital image duplication of the digital image with respect to the first anonymized image; and
transmit a message indicating an identification of the digital image as sufficiently duplicative of the first anonymized digital image of the plurality of anonymized digital images.

11. The intelligent system of claim 10, wherein the machine readable instructions further cause the intelligent system to perform at least the following when executed by the one or more processors:
output the message on a display of an external device communicatively coupled to and remote from the one or more processors.

12. The intelligent system of claim 11, wherein the message includes text indicating a likelihood of insurance fraud associated with the digital image based on the determination of digital image duplication of the digital image with respect to the first anonymized image.

13. The intelligent system of claim 11, wherein the message includes a numeric value indicating a likelihood of insurance fraud associated with the digital image based on the determination of digital image duplication of the digital image with respect to the first anonymized image.

14. The intelligent system of claim 10, wherein the machine readable instructions further cause the intelligent system to perform at least the following when executed by the one or more processors:
compare the encoding of the digital image with a second stored encoding of the plurality of stored encodings to generate a second comparison when the first similarity metric is less than the threshold, wherein the second stored encoding corresponds to a second anonymized digital image of the plurality of anonymized digital images; and
determine a second similarity metric based on the second comparison.

15. The intelligent system of claim 14, wherein the machine readable instructions further cause the intelligent system to perform at least the following when executed by the one or more processors:
compare the second similarity metric to the threshold; and
determine, using the artificial intelligence based software application, that the digital image is sufficiently duplicative of the second anonymized digital image of the plurality of anonymized digital images associated with the second stored encoding when the second similarity metric equals or exceeds the threshold.

16. The intelligent system of claim 15, wherein the machine readable instructions further cause the intelligent system to perform at least the following when executed by the one or more processors:
transmit, to an external device, a secondary message indicating an identification of the digital image as sufficiently duplicative of the second anonymized digital image of the plurality of anonymized digital images.

17. The intelligent system of claim 10, wherein the machine readable instructions further cause the intelligent system to perform at least the following when executed by the one or more processors:
receive an input modifying the threshold; and
updating the threshold based on the input.

18. The intelligent system of claim 10, wherein the machine readable instructions further cause the intelligent system to perform at least the following when executed by the one or more processors:
transmit a request for the first anonymized digital image to a platform on which the first anonymized digital image is stored based on the identification of the digital image as sufficiently duplicative of the first anonymized digital image.

19. An intelligent system for determining duplication of a digital image, comprising:
one or more processors;
one or more memory components communicatively coupled to the one or more processors; and
machine readable instructions stored in the one or more memory components that cause the intelligent system to perform at least the following when executed by the one or more processors:
receive an upload of the digital image by an artificial intelligence based software application;
generate, using the artificial intelligence based software application, an encoding of the digital image, wherein the encoding of the digital image comprises a mathematical representation representative of a plurality of features included within the digital image;
compare the encoding of the digital image with each of a plurality of stored encodings to generate respective comparisons, each of the plurality of stored encodings corresponding to a respective one of a plurality of anonymized digital images;
determine respective similarity metrics based on the respective comparisons;
compare each of the respective similarity metrics to a threshold;
determine, using the artificial intelligence based software application, that the digital image is sufficiently duplicative of at least one of the plurality of anonymized digital images associated with a respective one of the plurality of stored encodings when at least one of the respective similarity metrics equals or exceeds the threshold to generate a determination of digital image duplication of the digital image with respect to the first anonymized image;

transmit a message indicating an identification of the digital image as sufficiently duplicative of the at least one of the plurality of anonymized digital images;

output the message on a display of an external device communicatively coupled to and remote from the one or more processors; and transmit a request for the at least one of the plurality of anonymized digital images to a platform on which the at least one of the plurality of anonymized digital images is stored based on the identification of the digital image as sufficiently duplicative of the at least one of the plurality of anonymized digital images.

20. The intelligent system of claim 19, wherein the message includes text indicating a likelihood of insurance fraud associated with the digital image based on the determination of digital image duplication of the digital image with respect to the first anonymized image.

* * * * *